US007308159B2

United States Patent
Ruggiero

(10) Patent No.: US 7,308,159 B2
(45) Date of Patent: Dec. 11, 2007

(54) IMAGE PROCESSING SYSTEM AND METHOD WITH DYNAMICALLY CONTROLLED PIXEL PROCESSING

(75) Inventor: Carl J. Ruggiero, Tigard, OR (US)

(73) Assignee: Enuclia Semiconductor, Inc., Beaverton, OR (US)

( * ) Notice: Subject to any disclaimer, the term of this patent is extended or adjusted under 35 U.S.C. 154(b) by 336 days.

(21) Appl. No.: 11/036,462

(22) Filed: Jan. 13, 2005

(65) Prior Publication Data

US 2005/0157943 A1 Jul. 21, 2005

Related U.S. Application Data

(60) Provisional application No. 60/537,082, filed on Jan. 16, 2004.

(51) Int. Cl.
*G06K 9/32* (2006.01)
*G06K 9/54* (2006.01)
*G06K 9/60* (2006.01)

(52) U.S. Cl. .................... 382/303; 382/298
(58) Field of Classification Search ........ 382/298–300, 382/303
See application file for complete search history.

(56) References Cited

U.S. PATENT DOCUMENTS

| | | | |
|---|---|---|---|
| 4,641,188 A | 2/1987 | Dischert | |
| 4,881,125 A | 11/1989 | Krause | |
| 4,982,280 A | 1/1991 | Lyon et al. | |
| 5,020,115 A | 5/1991 | Black | |
| 5,301,020 A | 4/1994 | Cassereau | |
| 5,309,526 A | 5/1994 | Pappas et al. | |
| 5,317,398 A | 5/1994 | Casavant et al. | |
| 5,347,314 A | 9/1994 | Faroudja et al. | |
| 5,398,071 A | 3/1995 | Gove et al. | |
| 5,414,469 A | 5/1995 | Gonzales et al. | |
| 5,469,223 A | 11/1995 | Kimura | |
| 5,532,751 A | 7/1996 | Lui | |
| 5,563,660 A | 10/1996 | Tsukagoshi | |
| 5,604,821 A | 2/1997 | Ranganathan et al. | |
| 5,614,952 A | 3/1997 | Boyce et al. | |
| 5,621,470 A | 4/1997 | Sid-Ahmed | |
| 5,631,706 A | 5/1997 | Tsunashima | |
| 5,661,525 A | 8/1997 | Kovacevicet et al. | |
| 5,682,442 A | 10/1997 | Johnston et al. | |

(Continued)

*Primary Examiner*—Matthew C. Bella
*Assistant Examiner*—Wes Tucker
(74) *Attorney, Agent, or Firm*—Alleman Hall McCoy Russell & Tuttle LLP

(57) ABSTRACT

A system for processing digital images. The system may included a controller that includes a processor and a memory. The system may also include a plurality of image processing blocks operatively coupled with the controller. Each image processing block can be configured to perform a different image processing operation. The image processing blocks and controller can be interconnected and configured to provide sequential pixel processing, in which each image processing block processes input pixels so as to produce output pixels, with the output pixels of an upstream one of the image processing blocks can be fed forward as the input pixels to a downstream one of the image processing blocks. The system may also include a classification block configured to obtain, for each of the image processing blocks, updated classification data for the input pixels to be applied to the image processing block. Processing at each image processing block can be dynamically controlled based on the updated classification data for the input pixels applied to the image processing block.

8 Claims, 4 Drawing Sheets

U.S. PATENT DOCUMENTS

| | | |
|---|---|---|
| 5,689,305 A | 11/1997 | Ng et al. |
| 5,757,670 A | 5/1998 | Ti et al. |
| 5,784,175 A | 7/1998 | Lee |
| 5,787,206 A | 7/1998 | Williams et al. |
| 5,790,196 A | 8/1998 | Sun et al. |
| 5,790,714 A | 8/1998 | McNeil et al. |
| 5,805,724 A | 9/1998 | Metcalfe et al. |
| 5,822,464 A | 10/1998 | Metcalfe |
| 5,878,173 A | 3/1999 | Hashimoto et al. |
| 5,920,659 A | 7/1999 | Iverson et al. |
| 5,933,539 A | 8/1999 | Metcalfe et al. |
| 5,943,099 A | 8/1999 | Kim |
| 5,956,421 A | 9/1999 | Tanaka et al. |
| 5,970,178 A | 10/1999 | Lin |
| 6,005,621 A | 12/1999 | Linzer et al. |
| 6,026,182 A | 2/2000 | Lee et al. |
| 6,038,256 A | 3/2000 | Linzer et al. |
| 6,064,407 A | 5/2000 | Rogers |
| 6,075,875 A | 6/2000 | Gu |
| 6,091,777 A | 7/2000 | Guetz et al. |
| 6,121,978 A | 9/2000 | Miler |
| 6,157,365 A | 12/2000 | Callway |
| 6,184,908 B1 | 2/2001 | Chan et al. |
| 6,189,064 B1 | 2/2001 | MacInnis et al. |
| 6,201,577 B1 | 3/2001 | Swartz |
| 6,282,587 B1 | 8/2001 | Priem et al. |
| 6,301,428 B1 | 10/2001 | Linzer |
| 6,327,000 B1 | 12/2001 | Auld et al. |
| 6,339,434 B1 | 1/2002 | West et al. |
| 6,356,589 B1 | 3/2002 | Gebler et al. |
| 6,512,550 B1 | 1/2003 | de Garrido et al. |
| 6,519,367 B2 | 2/2003 | Nagarajan et al. |
| 6,529,633 B1 | 3/2003 | Easwar et al. |
| 6,545,719 B1 | 4/2003 | Topper |
| 6,567,559 B1 | 5/2003 | Easwar |
| 6,606,415 B1 | 8/2003 | Rao |
| 6,611,260 B1 | 8/2003 | Greenberg et al. |
| 6,671,319 B1 | 12/2003 | Chang et al. |
| 6,680,752 B1 | 1/2004 | Callway et al. |
| 6,707,467 B1 | 3/2004 | Suga |
| 6,717,622 B2 | 4/2004 | Lan |
| 6,757,022 B2 * | 6/2004 | Wredenhagen et al. ..... 348/452 |
| 6,775,334 B1 | 8/2004 | Liu et al. |
| 6,788,353 B2 | 9/2004 | Wredenhagen et al. |
| 6,868,189 B1 * | 3/2005 | Hoshino ..................... 382/260 |
| 2002/0159641 A1 | 10/2002 | Whitney et al. |
| 2002/0159642 A1 | 10/2002 | Whitney |
| 2002/0164070 A1 | 11/2002 | Kuhner et al. |
| 2003/0044061 A1 | 3/2003 | Prempraneerach et al. |
| 2003/0081836 A1 | 5/2003 | Averbuch et al. |
| 2005/0024384 A1 * | 2/2005 | Evans et al. ................ 345/604 |
| 2005/0063586 A1 * | 3/2005 | Munsil et al. .............. 382/162 |

* cited by examiner

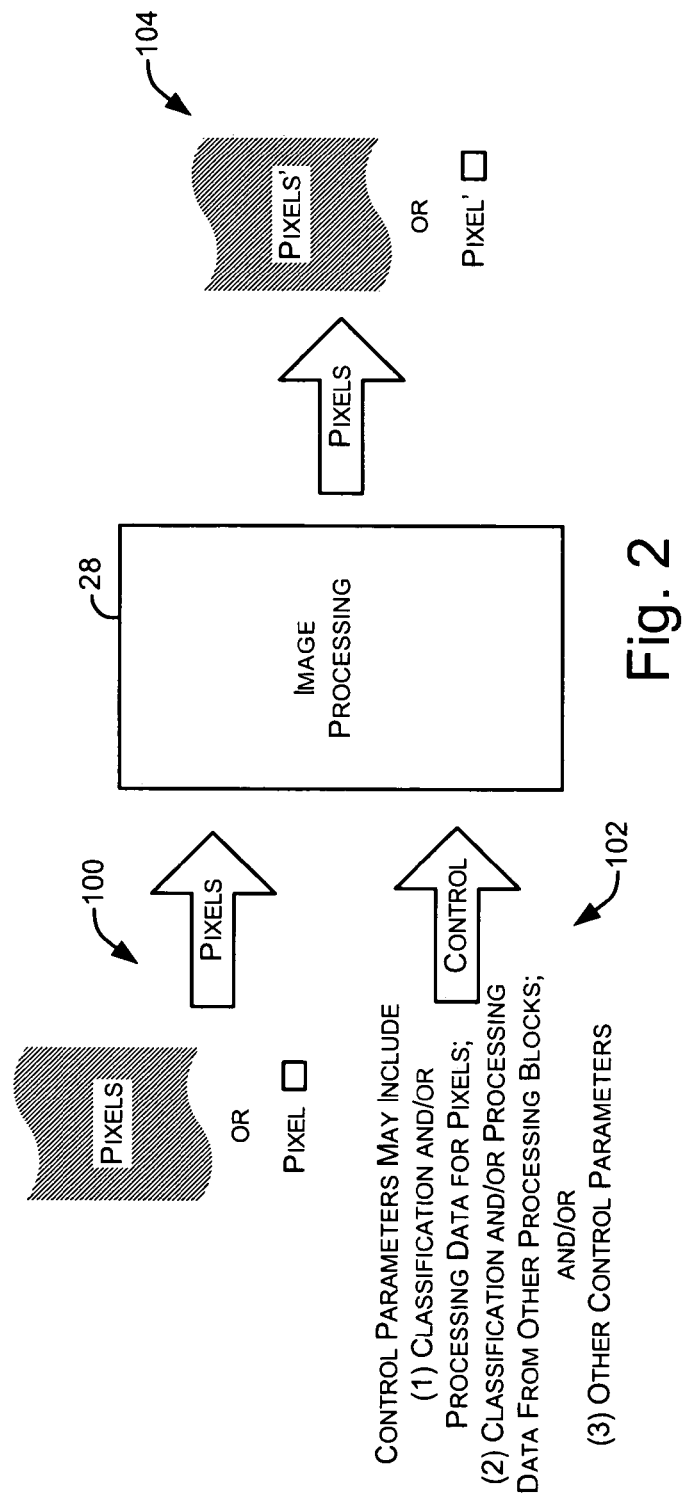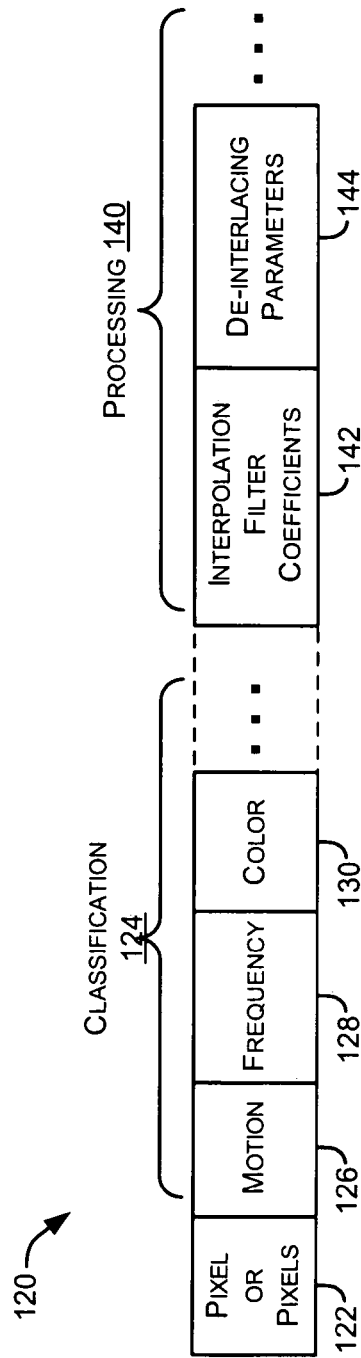

IMAGE PROCESSING SYSTEM AND METHOD WITH DYNAMICALLY CONTROLLED PIXEL PROCESSING

CROSS-REFERENCE TO RELATED APPLICATION

This application is based upon and claims the benefit under 35 U.S.C. § 119(e) of the following U.S. provisional patent application, which is incorporated herein by reference in its entirety for all purposes: Ser. No. 60/537,082, filed Jan. 16, 2004.

BACKGROUND

Many systems and methods exist for processing digital images. Prior image systems commonly include processing blocks for performing various operations on the pixels that comprise a digital image. These operations may include de-interlacing, increasing or reducing resolution, etc. Typical prior systems employ pre-determined, fixed processing algorithms for these operations. The different processing operations operate substantially independent of one another, and processing is not tuned or modified in response to changed pixel characteristics.

BRIEF DESCRIPTION OF THE DRAWINGS

FIG. 2 schematically depicts a dynamically controllable image processing block that may be employed in connection with the systems and methods of the present description.

FIG. 3 depicts various types of changeable classification data and processing data that may be associated with a pixel or group of pixels, such data being available as an input to an image processing block in order to dynamically tune or otherwise control the image processing block.

DETAILED DESCRIPTION

Figure 1:
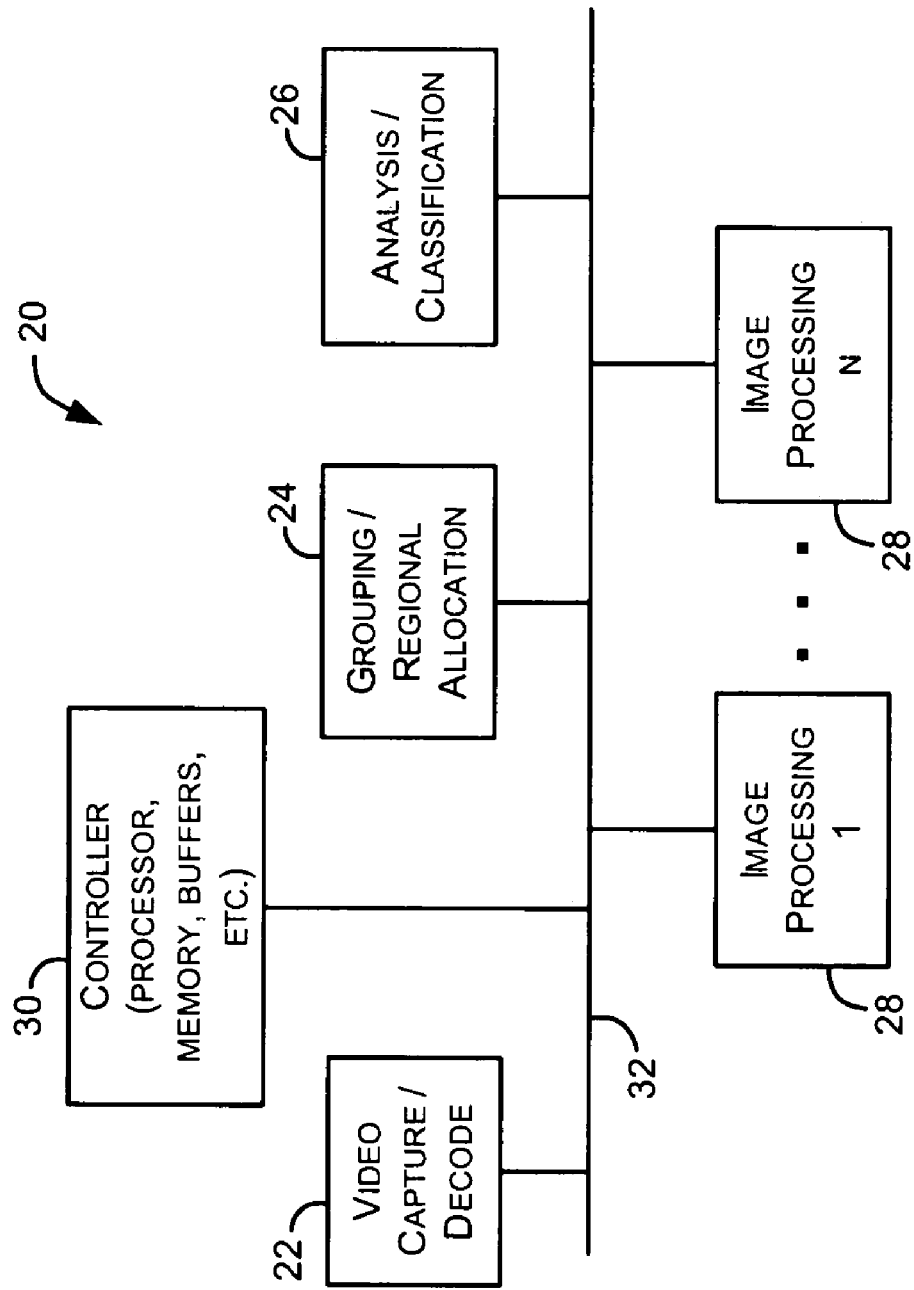
FIG. 1 schematically depicts an embodiment of an image processing system according to the present description.

FIG. 1 schematically depicts an embodiment of an image processing system 20 according to the present description. It should be appreciated that the figure is a schematic depiction, and that the depicted components may be consolidated or combined in various ways, or separated out into additional components, without departing from the spirit and scope of the described system.

Image processing system may include a block 22 for receiving and performing initial processing on an input video signal. Block 22 may be configured to handle analog and/or digital inputs. In the case of analog video, block 22 may include subcomponents to capture and/or decode an analog video signal, so as to produce corresponding pixels representing the input video frame(s). For example, an analog video decoder including a suitable analog to digital converter (ADC) may be employed to produce pixels representing the input video frame. These pixels may then be clocked into or otherwise applied to the processing pipeline. In typical embodiments, the pixels are serially clocked into the system.

For analog video, a device such as the Philips 7119 may be used to provide the pixels to be captured by the processing pipeline. For images captured through an analog to digital converter or from a DVI source, a device such as the Analog Devices 9887 may be used to provide pixels to be captured by the processing pipeline.

Additionally, or alternatively, block 22 may be configured to handle digital video input. In the case of digital video, a suitable digital video decoder may be implemented within capture/decode block 22 to reconstruct image frames. During the decode process, and at other points during processing, classification data may be associated with the pixels based upon the methods that were used to reconstruct the pixel. Current digital video decoders from companies such as Conexant (CX22490) or LSI Logic (SC2005) may be employed in connection with the embodiments described herein.

System 20 may also include a block 24 for grouping pixels. After capture, the pixels corresponding to the input video frame typically are allocated to fixed or variable sized regions based on a set of allocation criteria employed at block 24. The allocation criteria may vary considerably. Simple spatial allocations may be employed, such as groupings based on square, rectangular, or other geometric relationships of pixels to one another within the video frame. An object-based allocation system may be employed to group pixels based on the likelihood that the pixels belong to the same object in an image, such as a person's face. Grouping criteria may consist of spatial blocks such as those used in MPEG video encoding. Yet another grouping example is based on object recognition schemes, in which pattern matching is used to group areas of similar pixels.

Indeed, block 24 may group pixels according to any practicable criteria. Typically, this grouping or regionalizing of the pixels is employed to facilitate analysis and/or processing of the pixels by system 20. For example, for images of an athletic event with a lot of spectators in the background, the pixels corresponding to this background region could be grouped together (based on shared characteristics). Certain processing steps could then be applied to the grouped pixels as a whole, thus improving the speed and efficiency of the image processing for the video signal. In addition, grouping and regionalizing the video data may greatly improve processing granularity and increase the effectiveness of the dynamic, real-time processing systems and methods described herein.

Classification data may be appended to the pixel data, by block 24 or other portions of system 20, in the form of discrete bits or multi-bit parameters. Discrete bits may be used to flag the presence of a particular characteristic (such as a detected edge). A multi-bit field may be used to store a numeric value which indicates the quantity of a characteristic present in the pixels (such as motion).

Although some analysis and classification of pixels may be performed by other parts of system 20, the system may include a block 26 devoted to analyzing and classifying the pixels being processed. A variety of methods and systems may be employed to perform the classification, and the analysis may be performed to detect a variety of characteristics associated with the pixels, including motion information; gradients; quantization scale factors; prediction methods employed; inverse discrete cosie transform coefficients; frequency information (spatial and/or temporal frequencies); color information (brightness, contrast, hue, saturation, etc.); whether the pixels include text, graphics or other classifiable elements; whether film mode is being employed; etc. These characteristics commonly change during processing of the pixels, and may be referred to as classification data.

Determination of these characteristics may be performed using any practicable method. For example, frequency information may be obtained by computing the absolute difference between spatially adjacent pixels. Motion information can be generated by comparing pixels to those in one or more previous frames and then computing a difference.

As discussed in detail below, grouping block 24 and/or analysis block 26 may be repeatedly accessed during the processing of a pixel or group of pixels. Repeatedly updating classification data allows the system to dynamically track changing characteristics of processed pixels and dynamically respond in real time to those changes to dynamically control and enhance image processing.

Image processing system 20 also includes one or more image processing blocks 28. Blocks 28 may be configured to perform a variety of different image processing tasks, including de-interlacing, image interpolation or other resolution changes, color processing, luminance/chrominance separation, noise filtering, boosting, etc. Common embodiments employ separate blocks 28 for de-interlacing, image interpolation and color processing. As explained below, the present systems and methods enable processing at a given processing block to be dynamically controlled according to granular, changeable classification data.

System 20 may also include a controller 30 to perform and/or support the functioning of the other described blocks. Controller 30 may include a processor, memory, frame buffer and/or other components as necessary. The components of FIG. 1 may be coupled by a bus or other interconnections 32, as appropriate. It should also be understood that the depicted components may be implemented as a single integrated chip, or as plural discrete components combined or separated in any practicable way. Controller 30, for example, may be implemented with a separate processor and separate memory chip; the functionality of blocks 24 and 26 could be combined, etc.

Referring now to FIGS. 2 and 3, processing control at an individual processing block (e.g., a de-interlacing block) will be described. In FIG. 2, an exemplary image processing block 28 is depicted. As shown, pixels 100 (or a single pixel) are applied to block 28 to be processed. Block 28 processes pixels 100 according to a control input 102, so as to output processed pixels 104 (pixels'). As indicated, the control effected via input 102 may occur dynamically and be based on a variety of parameters, including classification data associated with pixels 100 (e.g., motion data, frequency data, etc.), processing information associated with pixels 100 (e.g., filter coefficients employed at another processing step, interpolation technique used at another step, whether a previous process was tuned to address sharpness issues, etc.), and/or other control parameters. Classification and/or processing data from other blocks (e.g., fed in from downstream or upstream blocks) may also be used to control processing at the instant block.

FIG. 3 more specifically shows how classification and/or processing data may be associated with a pixel or pixels. This data may be thought of as a multiple-field class 120, in which various types of data may be associated with pixels being processed in the pipeline. Field 122 indicates the pixels with which the other data fields are associated. Classification data 124 may be associated with the pixels, to describe characteristics or qualities of the pixel or pixels. Classification data 124 may include various types of information, including motion data 126, frequency data 128, color data 130, etc. Additionally, or alternatively, class 120 may include processing data 140 to indicate or describe processing that has already been performed on the pixel or pixels. Processing data 140 may include, by way of example, filtering information 142 from another processing block, parameters or methods 144 employed during de-interlacing, etc.

It should be further appreciated that regardless of how the data is organized or correlated, the data for a pixel or pixels may include not only current frame data, but also historical data (e.g., data from prior video frames) for the pixel. Classification data and/or processing data for prior or even subsequent pixels can be fed in to affect processing at a given processing block. Moreover, the classification and processing data dynamically changes as pixels move through the processing pipeline. This dynamically changing control data may be employed to improve image processing, through the mechanism of dynamically feeding the changing control data forward and/or backward in the processing pipeline. This produces dynamic feed-forward and feedback effects on image processing of other pixels, or on image processing of the same pixels at subsequent processing blocks.

Figure 4:
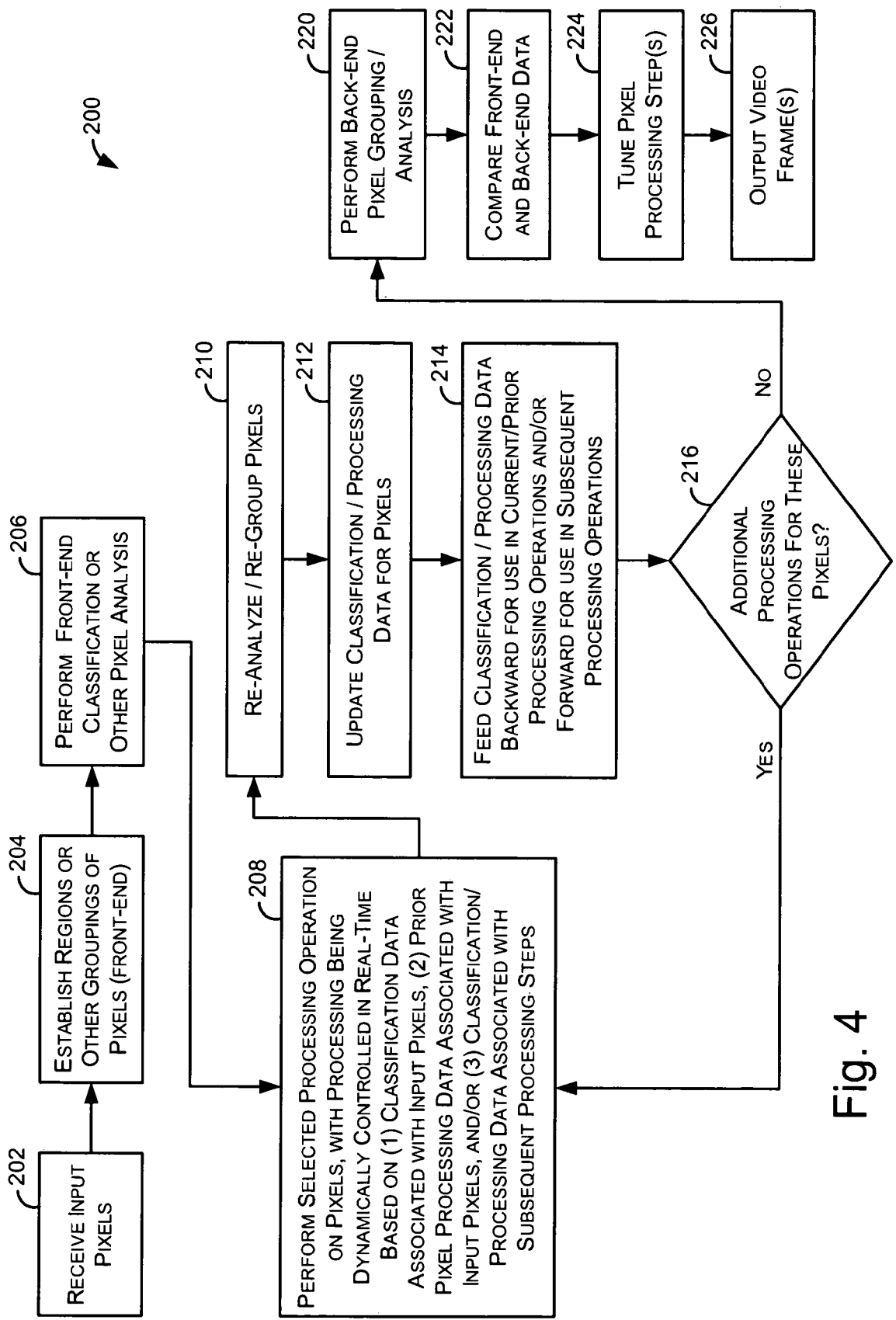
FIG. 4 depicts an exemplary implementation of a method for processing digital images according to the present description.

Turning now to FIG. 4, an exemplary image processing method 200 will be discussed. From the following description, it will be apparent that method 200 may be advantageously implemented in connection with the previously described systems and components. It should be appreciated, however, that the exemplary method, or aspects thereof, may be implemented independently of the particular embodiments discussed herein.

As shown at 202, method 200 may include receiving or otherwise obtaining the input pixels to be processed. This may be accomplished via the previously described analog/digital capture and decode features described above (e.g., capture/decode block 22 of FIG. 1). The received pixels may then be appropriately grouped or regionalized at 204, as previously discussed with reference to FIG. 1. The pixels may also be analyzed to obtain desired classification data, as shown at 206. Such classification data may include any of the previously discussed pixel classifiers, including motion data, frequency data, color information, gradient data, etc. The grouping and analysis of steps 204 and 206 may be referred to as front-end operations or tasks, because in the present example they are performed prior to any image processing of the pixels (e.g., prior to de-interlacing, image interpolation operations, etc.)

At 208, the method includes performing an image processing operation (e.g., de-interlacing, image interpolation, noise filtering, etc.) on the input pixels. As previously discussed, the processing operation may be dynamically controlled in accordance with classification data and/or processing data associated with the pixels (e.g., classification data 124 and processing data 140 of FIG. 3).

One use of classification data to dynamically tune image processing operations may be understood in the context of de-interlacing. In the present system, the de-interlacing method employed at any given point may be highly dependent upon the degree of motion detected in the pixels to be processed. As previously explained, the motion may be detected by assessing temporal changes for a pixel occurring over plural video frames. This motion information would then be associated with the pixel, for example through use of a multi-field class, such as class 120. The motion information embedded within the class fields would then be used to dynamically control the de-interlacing operation, and/or select the appropriate de-interlacing algorithm. One de-interlacing operation might be appropriate for pixels with a high degree of motion, while another de-interlacing operation (or a modified version of the first operation) might be more appropriate for static pixels or regions of the image.

The processing at step 208 may also be dynamically controlled based on prior processing of the pixels being fed into the processing operation. For example, the associated processing data (e.g., processing data 140) might indicate that certain algorithms had been applied to the pixels that are known to produce blurring effects in the presence of motion. This knowledge could then be used to tune the instant processing operation so as to enhance the sharpness of certain pixels, such as edges of moving objects.

Classification data or processing data associated with other processing operations, or with pixels other than those being processed at step 208, may also be employed to control the image processing operation at step 208. As shown in FIG. 4, after various post processing operation steps (e.g., at 210, 212, 214 and 216), another processing operation may be performed at 210. FIG. 1 shows a similar scheme of pipeline processing, in which a number of different processing operations (i.e., corresponding to the different image processing blocks 28) may be performed in a desired sequence. In the method of FIG. 4, for each pass through step 208, a different processing operation may be performed. For example, a de-interlacing operation might be performed in a first pass, with image interpolation, color processing and nose filtering being performed in subsequent passes.

For a given processing operation, classification data or processing data arising at one of the other processing operations in the pipeline may be employed to affect the processing operation. In a pipeline with de-interlacing, image interpolation and color processing operations, for example, the classification data for output pixels from the image interpolation process may be used to control the de-interlacing processing. In such a setting, analysis of the pixels coming out of the image interpolation process might reveal image quality issues that are best handled by an adjustment to the de-interlacing processing parameters. Processing data may also be fed back or forward through operations in the pipeline. In the above example, processing data from the image interpolation block may reveal repeated use of filter coefficients to improve sharpness. This processing data may be fed forward or backward (upstream or downstream) through the pipeline, so in the event that sharpness can be more effectively handled in other parts of the pipeline, that processing task is shifted to other blocks.

Referring still to FIG. 4, after the selected processing operation, the output pixels from the processing operation may be re-analyzed and/or re-grouped at 210. Typically, classification data for a pixel or pixels changes as a result of the applied processing operation: frequency information may change, gradients may change, motion vectors may be modified, etc. The classification data for a pixel or pixels may then be updated at 212. Additionally, or alternatively, processing information for the pixels may be updated at step 212. Indeed, any classification or processing information associated with the pixels may be updated, for example by updating the relevant fields of a multi-field class such as class 120 (FIG. 3).

From the foregoing description, it should be appreciated that the classification and processing data for a given pixel or pixels dynamically changes as the pixels move through the processing pipeline: pixel characteristics change, different processing parameters and algorithms are applied during processing, etc. This changing classification/processing information can be fed forward and backward through the processing pipeline to dynamically tune the processing operations occurring at any point in the system. Indeed, at step 214, the updated classification/processing information arising from the just-completed processing operation (step 208) is passed to desired portions of the processing pipeline, so as to have potential feed-forward and feedback effects on image processing operations. At 216, if additional processing operations are to be performed on the pixels (e.g., at a downstream block in the processing pipeline), method 200 returns to step 208 to perform the next selected processing operation.

If no additional processing operations are to be performed, a "back-end analysis" and comparison may be performed at 220 and 222. This may involve performing additional analysis to obtain updated classification information for the final output pixels. The results of this back-end analysis may be compared with the front-end data obtained at 204 and 206 in order to further dynamically tune or control any of the processing operations occurring within the processing pipeline. In the context of the exemplary system of FIG. 1, characteristics of the initial input pixels may be compared with classification of pixels comprising the final output video frames in order to assess whether processing objectives were achieved. This comparison would then be used to dynamically tune the processing operations performed by processing blocks 28 in the image processing pipeline, as shown at 224. After processing, the video frames are output as shown at 226.

Figure 5:
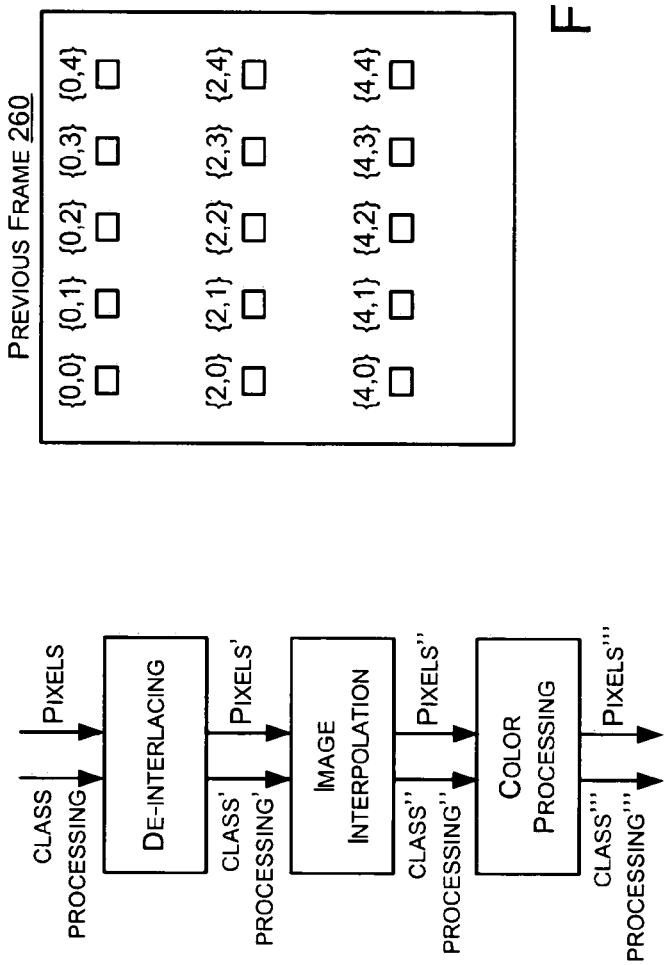
FIG. 5 depicts an exemplary processing pipeline according to the present description, including dynamically controllable processing blocks for performing de-interlacing, image interpolation and color processing operations.

Typical embodiments of the described image processing system and method include de-interlacing, image interpolation and color processing operations. These operations may be performed sequentially in a processing pipeline, as schematically depicted in FIG. 5. As previously discussed, input pixels are applied to each block, and the relevant processing operation is dynamically controlled based on classification information and/or processing information, which typically changes as the pixels are processed and move through the processing pipeline.

As previously discussed, typical embodiments of the described system and method include a de-interlacing block or processing operation. Many video signals are commonly provided in an interlaced format, in which every other horizontal line of an image scene is scanned and transmitted for a given video frame. Even- and odd-numbered scan lines are presented in an alternating succession of video frames. As a result, in a system in which sixty video frames per second are displayed, video frames containing the even-numbered lines are displayed thirty times and video frames containing the odd-numbered lines are displayed thirty times. In such an interlaced signal, a given video frame only contains 50% vertical resolution.

Figure 6:
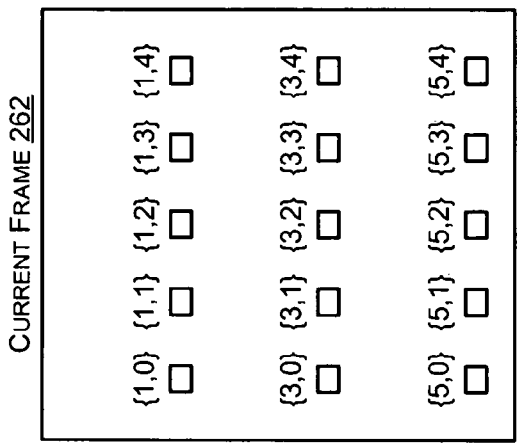
FIGS. 6 and 7 depict interlaced video frames and a dynamically controllable processing block for performing de-interlacing operations.

Referring to FIG. 6, operation of an exemplary de-interlacing block will be described, in which interlaced video frames are converted into a signal having full vertical resolution. Frames 260 and 262 are video frames of an interlaced video signal. As indicated, frame 262 may be referred to as the current frame, while frame 260 may be referred to as the previous frame. Each frame contains a plurality of pixels denoted with the legend {row,column}, indicating the row and column position of the pixels within the frame.

To construct frames having full vertical resolution, various methods may be employed. The missing rows of a current frame may simply be obtained and added in from a previous frame in a method known as field meshing. Meshing can provide high quality de-interlaced images, particularly when the pixels involved are static or exhibit a low degree of motion. Additionally, or alternatively, various types of interpolation may be employed, in which a target pixel is interpolated based on properties of one or more neighboring pixels. For example, the missing pixel {2,2} of current frame 262 may be interpolated by averaging or otherwise interpolating properties (e.g., brightness, hue, saturation, etc.) of neighboring pixels {1,2} and {3,2}, or of a larger set of adjacent pixels, such as pixels {1,1}, {1,2}, {1,3}, {3,1}, {3,2} and {3,3}.

Figure 7:
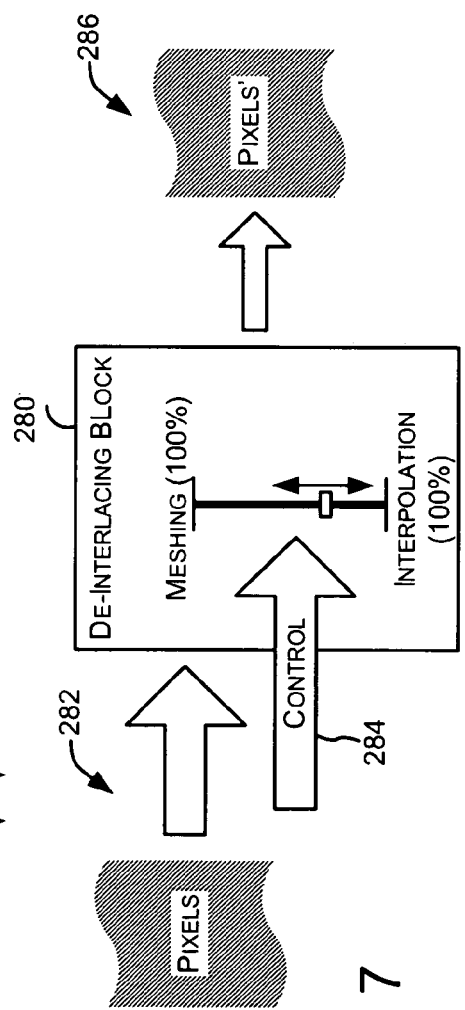

FIG. 7 depicts an exemplary de-interlacing block 280 according to the present description, which may be configured to receive input pixels 282, perform a de-interlacing operation upon the pixels based upon an applied control signal 284, and output processed pixels 286 in a de-interlaced format. De-interlacing block 280 may be implemented in a system such as that shown in FIG. 1, in which case the block would be one of the processing blocks 28 in the processing pipeline of FIG. 1.

Similar to the processing block described with reference to FIG. 2, the specific processing operation or methods being performed by block 280 (e.g., de-interlacing) may be dynamically varied in real-time according to classification and/or processing data associated with the input pixels 282. Additionally, or alternatively, classification and/or processing data associated with pixels other than pixels 282, or with other processing blocks in the pipeline, may be used to dynamically vary the de-interlacing operation. For example, selecting between field meshing and interpolation methods to reconstruct missing pixels may be determined to a large extent by motion classification data. Meshing may be undesirable for moving pixels, as meshing can create a "tearing" or "feathering" effect, due to the temporal shifts occurring between successive interlaced video frames. Interpolation may be more desirable for pixels having a high degree of motion.

In contrast, static or relatively static images may lend themselves more readily to de-interlacing using a non-interpolative method, such as field meshing. Meshing in some instances can produce sharper images, and may thus be preferable for de-interlacing low motion images. The exemplary block 280 is configured to not only select between interpolative and non-interpolative methods, but to blend the methods with desired weighting where appropriate, based on classification and/or processing data or other parameters embedded within control signal 284. In the depicted example, the control signal can cause deployment of a pure meshing method, a purely interpolative method, or any blending of those two extremes.

It should be understood that any number of de-interlacing methods may be selected or selectively combined based on classification data and/or processing data, including field mixing with a FIR filter, use of a median filter, line doubling, use of vertical temporal filters, averaging filters, etc. Generalizing to a de-interlacing processing block with N alternate de-interlacing methods or algorithms, the present system may be employed to combine or cross-fade between the alternate methods in any desired way, based on the rich control data available in the processing data and/or classification data. Some of the alternate methods may be weighted or emphasized more heavily than others, one particular method may be selected to the exclusion of others, etc. In other words, the classification data and/or processing data may be used to control the extent to which each available de-interlacing method participates in the de-interlacing process to produce a target pixel or pixels.

This example of FIG. 7 may be used to illustrate how classification data and processing data may be fed forward and/or backward to dynamically tune processing in real-time. Assume that input pixels 282 are from a particular region of a video frame, and that classification data associated with pixels 282 indicates a high degree of motion in that portion of the video frame. The processing at de-interlacing block 282 could then be dynamically adjusted to construct full vertical resolution using a method weighted more heavily toward interpolation, perhaps even a purely interpolative method, in order to avoid feathering or other unwanted artifacts.

As previously discussed, interpolative de-interlacing methods can cause blurring effects or other loss of sharpness. Continuing with the above example, if a loss of sharpness were to occur due to use interpolation during de-interlacing, that would be reflected in the classification data obtained for the output pixels (e.g., by analysis/classification block 26 of FIG. 1). The associated classification data would flow downstream to the next processing block, which would factor in the lack of sharpness in tuning its processing algorithm. In alternate embodiments classification data may be sent upstream.

Additionally, or alternatively, information about the de-interlacing operation itself could be reported upstream or downstream. In the present example, the reported processing information would indicate that a highly interpolative method was used for de-interlacing. Other processing operations could be dynamically tuned in response to compensate for potential sharpness loss resulting from the de-interlacing operation.

Classification and/or processing data may also be fed upstream or downstream to control processing blocks or operations that vary the resolution of input pixels (image interpolation). Resolution changes may be applied differently to different regions of the input video frame, and may include reduction in resolution and/or increases in resolution (upconversion). The methods employed to vary the resolution may be dynamically controlled based on the input classification and/or processing data. Typically, the dynamic control causes dynamic variation of image scaling coefficients used to derive target pixels. The dynamic control of the coefficients may be employed whether the image is being scaled up or down, and may further be employed in connection with linear and non-linear methods.

Figure 8:
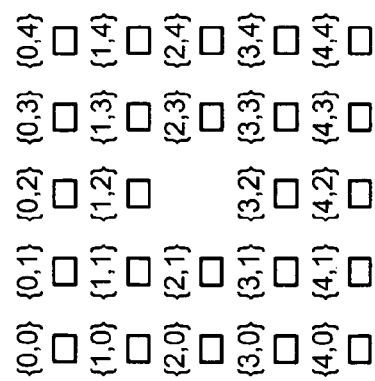
FIG. 8 depicts, in the context of an image interpolation processing operation, a pixel grid and a target pixel to be interpolated from one or more known pixel values in the grid.

For example, upconversion may be accomplished by sampling the input pixels, and applying the sampled values to a new larger grid of pixels. This process can involve pixel replication using "nearest neighbor" methods, though interpolation will commonly be employed. One common method is a cubic convoluting interpolation method, employing a multiple coefficient filter. Referring to FIG. 8, a grid of pixels is shown. At the center of the grid is a target pixel whose value is to be determined. Interpolative methods may determine this pixel by assessing the values of neighboring pixels. The value of a neighboring pixel may be taken into account, as well as its distance from the target pixel.

Indeed, cubic convoluting interpolation involves interpolating based on four known pixels. For example, in the horizontal direction in FIG. 8, the target pixel may be interpolated from the values of known pixels {2,0}, {2,1}, {2,3} and {2,4}, taking into account the values of the known pixels and their distances from the target pixel. Image scaling coefficients may also be employed, to more heavily weight certain pixels and to filter out noise or other high frequency artifacts in the upconverted image. The interpolations methods typically are applied in both the horizontal and vertical directions to determine values of target pixels.

Classification data and processing data associated with the pixels, or from other sources, may be used to dynamically tune the image interpolation methods. Interpolation coefficients may be determined according to or based on motion, gradient and/or frequency information associated with the input pixels. If prior processing algorithms have provided sub-optimal sharpness enhancement, filter coefficients may be selected for image interpolation to preserve or enhance sharpness in portions of the image.

It will be appreciated that the dynamic control and feed-forward and feedback features discussed herein are equally applicable to color processing and other image processing operations. In the context of color processing, the changing classification and processing data associated with input pixels can be used to control, adjust or select algorithms used to vary brightness, contrast, hue, saturation, color space conversions, etc., of the input pixels. Overall brightness of pixels may be reduced in response to motion information for a pixel. Motion history for a pixel or pixels may be used to identify and correct artifacts associated with occlusion problems. In addition to, or instead of, basing control on data associated with the input pixels, control may be based on classification or processing data fed in from other portions of the processing pipeline (via feedback or feed-forward configurations).

While the present embodiments and method implementations have been particularly shown and described, those skilled in the art will understand that many variations may be made therein without departing from the spirit and scope of the invention. The description should be understood to include all novel and non-obvious combinations of elements described herein, and claims may be presented in this or a later application to any novel and non-obvious combination of these elements. Where claims recite "a" or "a first" element or the equivalent thereof, such claims should be understood to include incorporation of one Or more such elements, neither requiring nor excluding two or more such elements.

What is claimed is:

1. A system for processing digital images, comprising:
   a controller including a processor and a memory;
   a plurality of image processing blocks operatively coupled with the controller, each image processing block being configured to perform a different image processing operation, where the image processing blocks and controller are interconnected and configured to provide sequential pixel processing, in which each image processing block processes input pixels so as to produce output pixels, with the output pixels of an upstream one of the image processing blocks being fed forward as the input pixels to a downstream one of the image processing blocks; and
   a classification block configured to obtain, for each of the image processing blocks, undated classification data for the input pixels to be applied to the image processing block, and where processing at each image processing block is dynamically controlled based on the updated classification data for the input pixels applied to the image processing block,
   where for at least one of the image processing blocks, the controller is configured to dynamically control processing by selectively combining multiple different processing techniques associated with such image processing block, where such selective combination is performed based on updated classification data of the input pixels applied to such image processing block.

2. The system of claim 1, where the controller is configured to dynamically control processing occurring at another of the image processing blocks based on the selective combination of processing techniques at the at least one of the image processing blocks.

3. A system for processing digital images, comprising:
   a controller including a processor and a memory;
   a plurality of image processing blocks operatively coupled with the controller, each image processing block being configured to perform a different image processing operation, where the image processing blocks and controller are interconnected and configured to provide sequential pixel processing, in which each image processing block processes input pixels so as to produce output pixels, with the output pixels of an upstream one of the image processing blocks being fed forward as the input pixels to a downstream one of the image processing blocks; and
   a classification block configured to obtain, for each of the image processing blocks, updated classification data for the input pixels to be applied to the image processing block, and where processing at each image processing block is dynamically controlled based on the updated classification data for the input pixels applied to the image processing block,
   where the image processing blocks include a de-interlacing block, an image interpolator block configured to effect resolution changes, and a color processing block,
   and where processing at the image interpolator block is dynamically controlled in response to processing at the de-interlacing block.

4. A system for processing digital images, comprising:
   a controller including a processor and a memory:
   a plurality of image processing blocks operatively coupled with the controller, each image processing block being configured to perform a different image processing operation, where the image processing blocks and controller are interconnected and configured to provide sequential pixel processing, in which each image processing block processes input pixels so as to produce output pixels, with the output pixels of an upstream one of the image processing blocks being fed forward as the input pixels to a downstream one of the image processing blocks; and
   a classification block configured to obtain, for each of the image processing blocks, updated classification data for the input pixels to be applied to the image processing block, and where processing at each image processing block is dynamically controlled based on the updated classification data for the input pixels applied to the image processing block,
   where the image processing blocks include a de-interlacing block, an image interpolator block configured to effect resolution changes, and a color processing block,
   and where processing at the color processing block is dynamically controlled in response to processing at the image interpolator block.

5. A system for processing digital images, comprising:
   a controller including a processor and a memory; and a plurality of image processing blocks operatively coupled with the controller, each image processing block being configured to perform a different image processing operation, where the image processing blocks and controller are interconnected and configured to provide sequential pixel processing, in which each image processing block processes input pixels so as to produce output pixels, with the output pixels of an upstream one of the image processing blocks being fed forward as the input pixels to a downstream one of the image processing blocks, where the controller is configured to dynamically control the image processing operation performed at one of the image processing blocks based on the image processing operation performed at another of the image processing blocks, where the controller is configured to dynamically control the image processing blocks in response to classification data associated with pixels being processed by the image processing blocks, and where the classification data varies as the pixels move from one image processing block to another, and where the controller is configured to be responsive to such variation in the classification data when dynamically controlling the image processing blocks, and where for at least one of the image processing blocks, the controller is configured to dynamically control processing by selectively combining multiple different processing techniques associated with such image processing block, where such selective combination is performed based on updated classification data of the input pixels applied to such image processing block.

6. A system for processing digital images, comprising:
a controller including a processor and a memory; and
a plurality of image processing blocks operatively coupled with the controller, each image processing block being configured to perform a different image processing operation, where the image processing blocks and controller are interconnected and configured to provide sequential pixel processing, in which each image processing block processes input pixels so as to produce output pixels, with the output pixels of an upstream one of the image processing blocks being fed forward as the input pixels to a downstream one of the image processing blocks, where the controller is configured to dynamically control the image processing operation performed at one of the image processing blocks based on the image processing operation performed at another of the image processing blocks, and where one of the image processing blocks is an image interpolator block configured to change the resolution of the input pixels that are applied to the image interpolator block, and where the controller is configured to dynamically vary image scaling coefficients used to derive the output pixels of the image interpolator block, based on the image processing operation performed at another of the image processing blocks.

7. A method of processing digital images, comprising:
receiving input pixels;
performing a first image processing operation on the input pixels:
performing a second image processing operation, where the second image processing operation is dynamically controlled based on processing data associated with the first image processing operation, where the processing data includes information about processing methods used to perform the first image processing operation;
outputting output pixels from the first image processing operation;
obtaining updated classification data associated with the output pixels; and
dynamically controlling the second image processing operation based on the undated classification data.
where obtaining undated classification data includes obtaining motion data associated with the output pixels,
and where dynamically controlling the second image processing operation includes dynamically varying image scaling coefficients associated with the second image processing operation based on the motion data.

8. A method of processing digital image comprising:
receiving input pixels;
performing a first image processing operation on the input pixels;
performing a second image processing operation, where the second image processing operation is dynamically controlled based on processing data associated with the first image processing operation, where the processing data includes information about processing methods used to perform the first image processing operation;
outputting output pixels from the first image processing operation;
obtaining updated classification data associated with the output pixels; and
dynamically controlling the second image processing operation based on the updated classification data,
where obtaining undated classification data includes obtaining motion data associated with the output pixels,
and where dynamically controlling the second image processing operation includes dynamically and selectively combining multiple alternate processing methods associated with the second image processing operation based on the motion data.

* * * * *